United States Patent [19]

Horiuchi et al.

[11] Patent Number: 4,893,331
[45] Date of Patent: Jan. 9, 1990

[54] SYSTEM ALLOWING SELECTIVE CONNECTION OF VARIOUS TYPES OF EXTERNAL APPARATUSES TO TELEPHONE SET

[75] Inventors: Takeshi Horiuchi, Hino; Yasuji Sato, Hachioji; Yasuo Funato, Hino, all of Japan

[73] Assignee: Kabushiki Kaisha Toshiba, Kawasaki, Japan

[21] Appl. No.: 157,808

[22] Filed: Feb. 19, 1988

[30] Foreign Application Priority Data

Feb. 24, 1987 [JP] Japan .................................. 62-40595
Mar. 20, 1987 [JP] Japan .................................. 62-66669

[51] Int. Cl.⁴ .......................................... H04M 11/00
[52] U.S. Cl. ...................................... 379/93; 379/102; 379/378; 379/430; 379/442
[58] Field of Search ................ 379/93, 430, 442, 378, 379/102

[56] References Cited

U.S. PATENT DOCUMENTS

| 4,146,754 | 3/1979 | Rose | 379/102 |
| 4,367,374 | 6/1983 | Serrano | 379/442 |
| 4,397,767 | 7/1983 | Shum | 379/93 |
| 4,449,017 | 5/1984 | Burke et al. | 379/387 |
| 4,524,244 | 6/1985 | Faggin et al. | 379/93 |
| 4,558,178 | 12/1985 | Yasuda et al. | 379/430 |
| 4,578,537 | 3/1986 | Faggin et al. | 379/93 |

Primary Examiner—Jin F. Ng
Assistant Examiner—Wing F. Chan
Attorney, Agent, or Firm—Finnegan, Henderson, Farabow, Garrett and Dunner

[57] ABSTRACT

A system allowing selective connection of various types of external apparatuses to a telephone set, which system comprises a plurality of switching circuits connected to the external apparatuses and a plurality of external apparatus interface circuit having mutually different characteristics and connected through the plurality of switching circuits to the external apparatuses, wherein any one of these switching circuits is turned on and at the same time the other circuits are turned off to selectively connect one of the interface circuits to one of the external apparatuses.

12 Claims, 6 Drawing Sheets

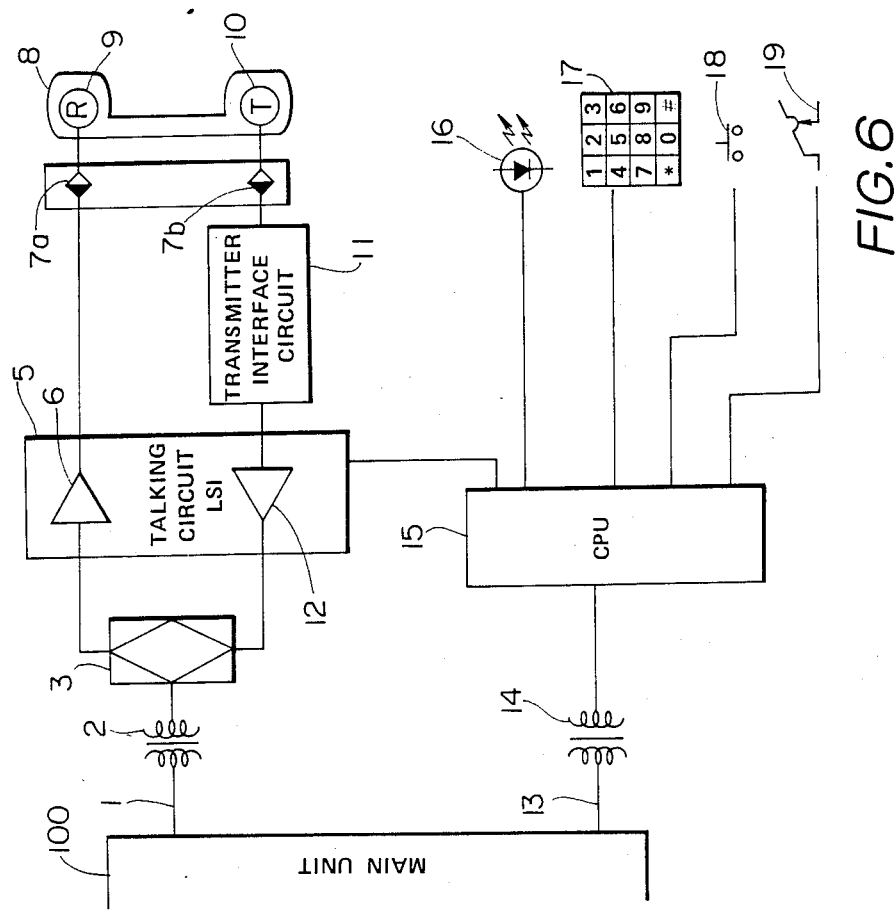

SYSTEM ALLOWING SELECTIVE CONNECTION OF VARIOUS TYPES OF EXTERNAL APPARATUSES TO TELEPHONE SET

BACKGROUND OF THE INVENTION

1. Field of the Invention

The present invention relates to a system allowing selective connection of various types of external apparatuses such as a handset and a headset to a telephone set.

2. Description of the Related Art

Referring to FIG. 6, there is shown a block diagram of a prior art key telephone set system in which a voice signal, which is transmitted through a voice signal transmission line 1 from a main unit 100 connected to outside lines not shown, is applied to a hybrid circuit 3 through a voice signal transformer 2 and further from the circuit 3 to a receiver 9 of a handset 8 through a receiving-voice amplifier 6 of a talking circuit LSI 5 and a connecting terminal 7a. A voice signal emitted from a transmitter 10 of the handset 8 is applied to the hybrid circuit 3 through a connecting terminal 7b, a transmitter interface circuit 11 and a transmitting-voice amplifier 12 of the talking circuit LSI 5, and further from the hybrid circuit 3 through a voice transformer 2 to the voice-signal transmission line 1 leading to the main unit 100.

On the other hand, a control signal, which is transmitted through a data transmission line 13 from the main unit 100, is applied through a data transformer 14 to a CPU 15 which in turn controls the talking circuit LSI 5 and a light emitting diode 16 in response to the received control signal. When a dialing key 17, a button switch 18 or a hook switch 19 is operated, the CPU 15 sends a control signal indicative of the operated switch or key through the data transformer 14 to a transmission line 13 leading to the main unit 100.

Recent demand for improving the reliability of the system and lowering the power consumption, cost and the like thereof has led to the formation of the hybrid circuit and transmitter interface circuit in a semiconductor form and the employment of a transmitter of a type other than a carbon type, e.g., an electret type, a dynamic type or the like. However, the electret and dynamic type transmitters require a transmitter interface circuit different in type from that in the case of the carbon type transmitter, because the electret and dynamic types have characteristics such as output impedance, output signal level and operating DC current which characteristics are much different from those of the carbon type. For this reason, even when it is desired from a design demand to connect the dynamic type transmitter including the transmitter interface circuit with a handset having a carbon type transmitter or with various external apparatuses (including, for example, a headset, an external transmitting speech amplifier, a modem and so on) having interface conditions meeting the carbon type transmitter, such interconnection has been impossible because of their mismatching of the aforementioned output impedance, output signal level, DC current and the like.

In this way, the prior art telephone set system has had such a problem that, for example, in the case where a transmitter interface circuit is incorporated in a dynamic type transmitter, even if it is desired to connect to the dynamic type transmitter a handset having a carbon type transmitter or various types of interface units having interface conditions meeting the carbon type transmitter, such interconnection is impossible because of their mismatching of the output impedance, output signal level DC current and the like.

OBJECT AND SUMMARY OF THE INVENTION

In view of such circumstances, it is an object of the present invention to provide a system in which a telephone set can have various types of transmitters and can be connected to various types of external apparatuses having interface conditions meeting these various transmitters.

The present invention comprises a plurality of switching circuits connected to external apparatuses and a plurality of interface circuits of the external apparatuses connected to the external apparatus through the plurality of switching circuits having mutually different characteristics, wherein the turning on of any one of the plurality of switching circuits causes the turning off of the other switching circuits.

With such an arrangement, one of the plurality of external apparatus interface circuits can be selectively connected to an external apparatus and thus a telephone set can have various types of transmitters and can be connected to various types of external apparatuses having interface conditions meeting these various transmitters.

BRIEF DESCRIPTION OF THE DRAWINGS

FIG. 6 is a block diagram showing a prior art telephone set system.

DESCRIPTION OF THE PREFERRED EMBODIMENTS

Embodiments of the present invention will be detailed by referring to attached drawings.

Figure 1:
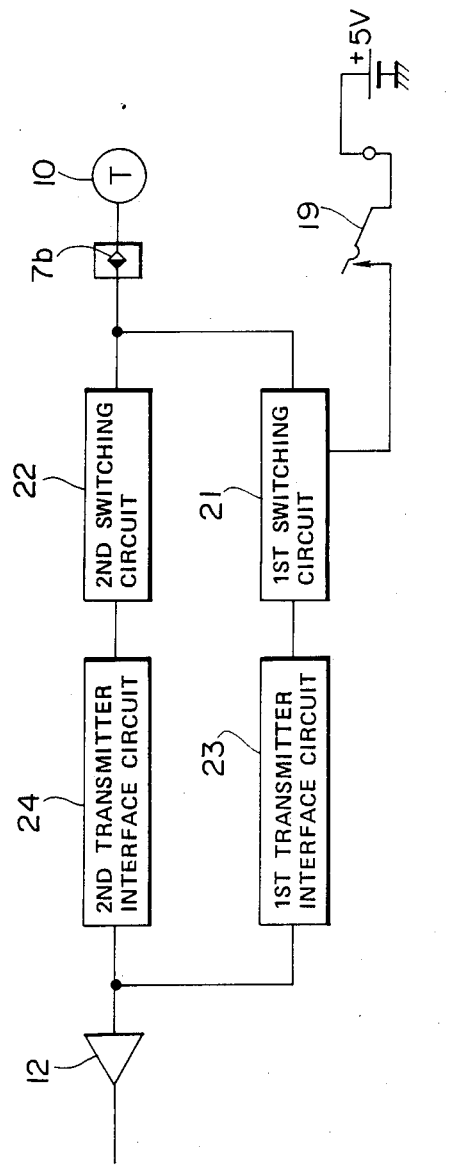
FIG. 1 is a block diagram showing an embodiment of a system allowing selective connection of external apparatuses to a telephone set in accordance with the present invention.
Figure 5:
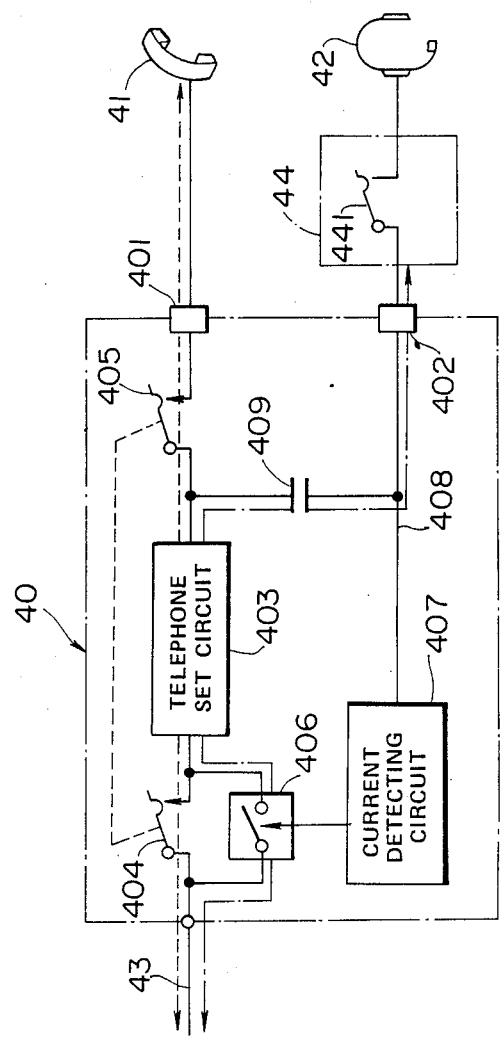
FIG. 5 is a block diagram showing yet another embodiment of the present invention.

Shown in FIG. 1 is a block diagram of an embodiment of the present invention, in which a transmitter interface circuit 11 inserted between the connecting terminal 7b of the transmitter 10 and the transmitting-voice amplifier 12 in the prior art telephone set system of FIG. 5 is replaced by first and second switching circuits 21 and 22 connected to the transmitter 10 through the connecting terminal 7b as well as by first and second transmitter interface circuits 23 and 24 connected in series with the first and second switching circuits 21 and 22 respectively. The first interface circuit 23 has interface conditions corresponding, for example, to a carbon type transmitter, while the second interface circuit 24 has interface conditions corresponding, for example, to a dynamic type transmitter.

Now in the case where the transmitter 10 is, for example, a dynamic type, the second switching circuit 22 is turned on and the first switching circuit 21 is turned off to connect the transmitter 10 with the second interface circuit 24 through the connecting terminal 7b and the second switching circuit 22. As a result, a voice signal outputted from the dynamic type transmitter 10 is transmitted to the transmitting-voice amplifier 12 through the second interface circuit 24 having interface conditions corresponding to the dynamic type transmitter. The transmitting-voice amplifier 12, when receiving this voice signal, amplifies the voice signal and sends it to the voice-signal transmission line 1 via the hybrid circuit 3 and the voice transformer 2 shown in FIG. 5.

In the case where the transmitter 10 is, for example, a carbon type, the first and second switching circuits are turned on and off respectively to connect the transmitter 10 to the first interface circuit 23 through the connecting terminal 7b and the first switching circuit 21. As a result, a voice signal emitted from the carbon type transmitter 10 is transmitted to the transmitting-voice amplifier 12 through the first interface circuit 23 having interface conditions corresponding to the carbon type transmitter. Note that even if the first switching circuit 21 itself is turned on, the circuit 21 is put in its OFF state when the handset 8 is in its on-hook state, i.e., when the hook switch 19 is turned off, while the circuit 21 is put in its ON state only when the hook switch 19 is turned on.

In this way, the present embodiment is arranged so that one of the first and second switching circuits 21 and 22 is turned on and the other is turned off to connect the transmitter 10 to either one of the first and second interface circuits 23 and 24. As a result, the dynamic and carbon type transmitters can be selectively used.

Figure 2:
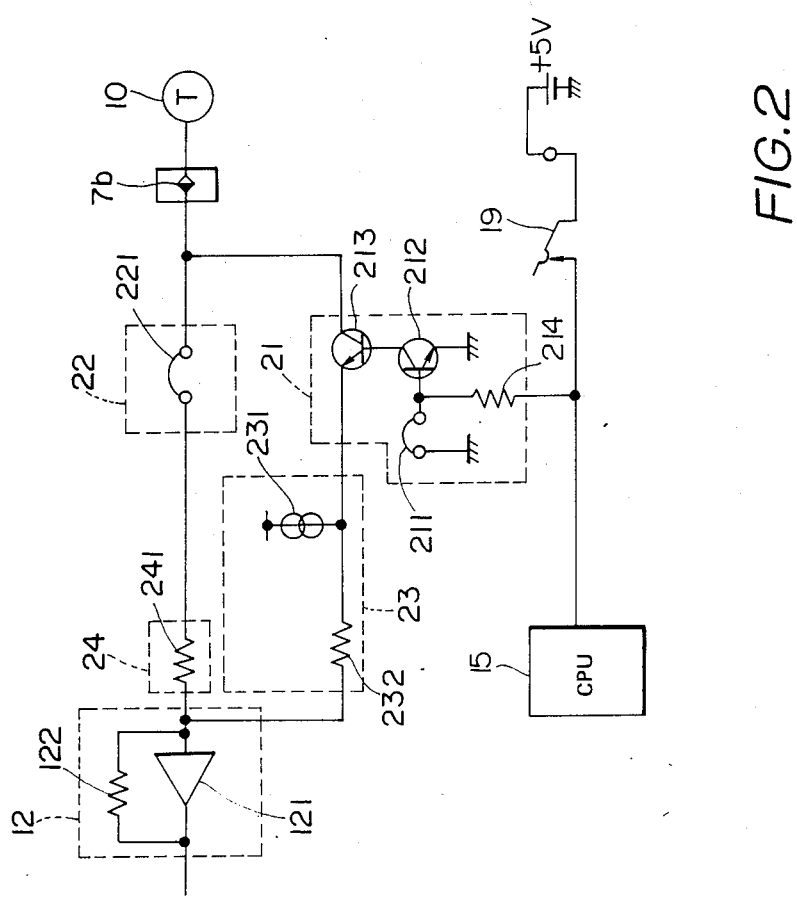
FIG. 2 is a circuit diagram showing details of the embodiment shown in FIG. 1.

FIG. 2 is a circuit diagram showing details of the embodiment of FIG. 1. When the dynamic type transmitter 10 is used, jumper wires 211 and 221 of the first and second switching circuits respectively, are connected as illustrated. That is, the second switching circuit 221 is put in the ON state, whereas the first switching circuit 21 is put in he OFF state. A transistor 212 is grounded at its base through the jumper wire 211 to be turned off so that no base current of a transistor 213 flows through the transistor 212 in the OFF state causing the transistor 213 to be put in the OFF state. As a result, a voice output signal of the dynamic type transmitter 10 is applied through the connecting terminal 7b and the jumper wire 221 to the second interface circuit 24 having interface conditions corresponding to the dynamic type transmitter. The second interface circuit 24, which comprises a resistor 241, supplies the received voice signal through the resistor 241 to the transmitting-voice amplifier 12. The amplifier 12, which comprises an operational amplifier 121 and a resistor 122, amplifies and outputs the received voice signal at the operational amplifier 121 whose gain is determined by a ratio of the resistor 122 to the resistor 241 of the second interface circuit 24.

When the transmitter 10 of the carbon type is used, the jumper wire 211 of the first switching circuit 21 and the jumper wire 221 of the second switching circuit 22 are both disconnected, thus putting the second switching circuit 22 in the OFF state. If the handset 8 is off the hook and thus the hook switch 19 is turned on, then an off-hook signal "1" (DC voltage) is applied through a resistor 214 to the base of the transistor 212 of the first switching circuit 21 so that the transistor 212 is turned on and thus a current flows through the base of the transistor 213, thus turning on the transistor 213. If the handset 8 is off the hook and thus the hook switch 19 is turned off, then the transistor 212 is turned off while the transistor 213 is turned off. That is, the first switching circuit 21 is put in the ON state when the hook switch 19 is turned on and put in the OFF state when the switch 19 is turned off. When the first switching circuit 21 is turned on, a constant-current circuit 231 supplies a transmitter current signal (DC current) to the carbon type transmitter 10 through the first switching circuit 21 and the connecting terminal 7b. As a result, a voice signal emitted from the carbon type transmitter 10 is applied via the connecting terminal 7b and the transistor 213 to the first transmitter interface circuit 23 having interface conditions corresponding to the carbon type transmitter. The first interface circuit 23, which has a resistor 232, applies the voice signal to the transmitting-voice amplifier 12 through the resistor 232. The transmitting-voice amplifier 12 amplifies and outputs the received voice signal at the operational amplifier 121 whose gain is determined by a ratio of the resistor 122 to the resistor 232 of the first interface circuit 23.

In this manner, in the case where the transmitter 10 is a dynamic type transmitter, the jumper wires 211 and 221 are connected to turn off and on the first and second switching circuits 21 and 22 respectively; whereas, in the case where the transmitter 10 is a carbon type transmitter, the jumper wires 211 and 221 are disconnected to turn on the first switching circuit 21 only when the hook switch 19 is turned on and at the same time to turn off the second switching circuit 22.

Figure 3:
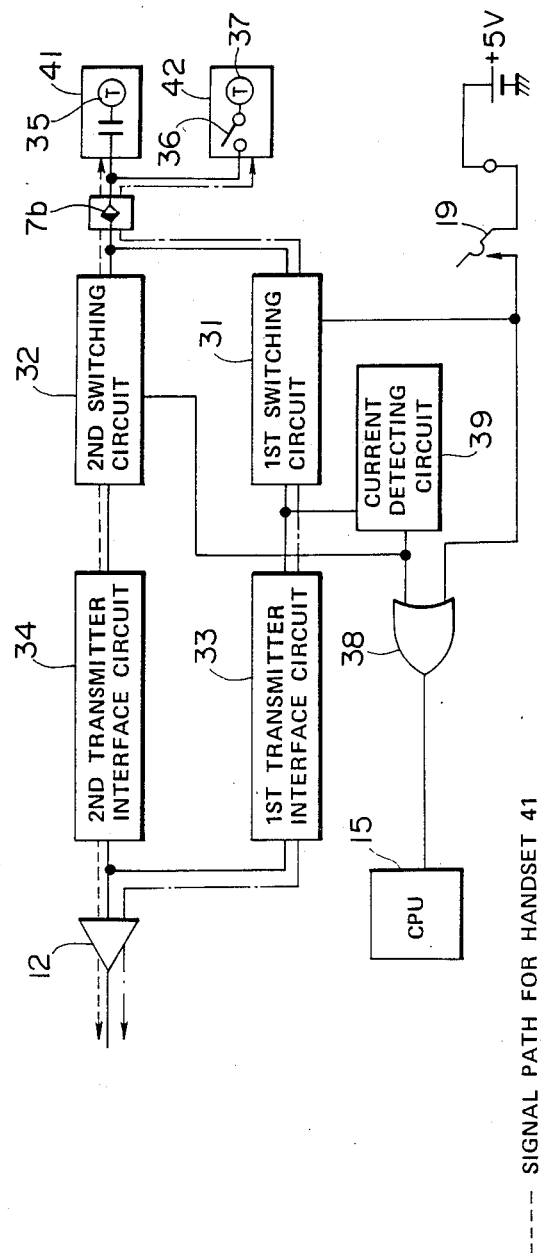
FIG. 3 is a block diagram showing another embodiment of the present invention.

Referring to FIG. 3, there is shown a block diagram of another embodiment of the present invention wherein first and second switching circuits 31 and 32 are commonly connected at one end to the connecting terminal 7b and connected at the other end in series with first and second interface circuits 33 and 34 respectively. The first interface circuit 33 has interface conditions corresponding, for example, to a carbon type transmitter, while the second interface circuit 34 has interface conditions corresponding, for example, to a dynamic type transmitter. Also commonly connected to the connecting terminal 7b are, for example, a dynamic type transmitter 35 connected in series with a capacitor, both incorporated in a handset 41, and a carbon type transmitter 37 connected in series with a switch 36, both incorporated in a headset 42.

Figure 4:
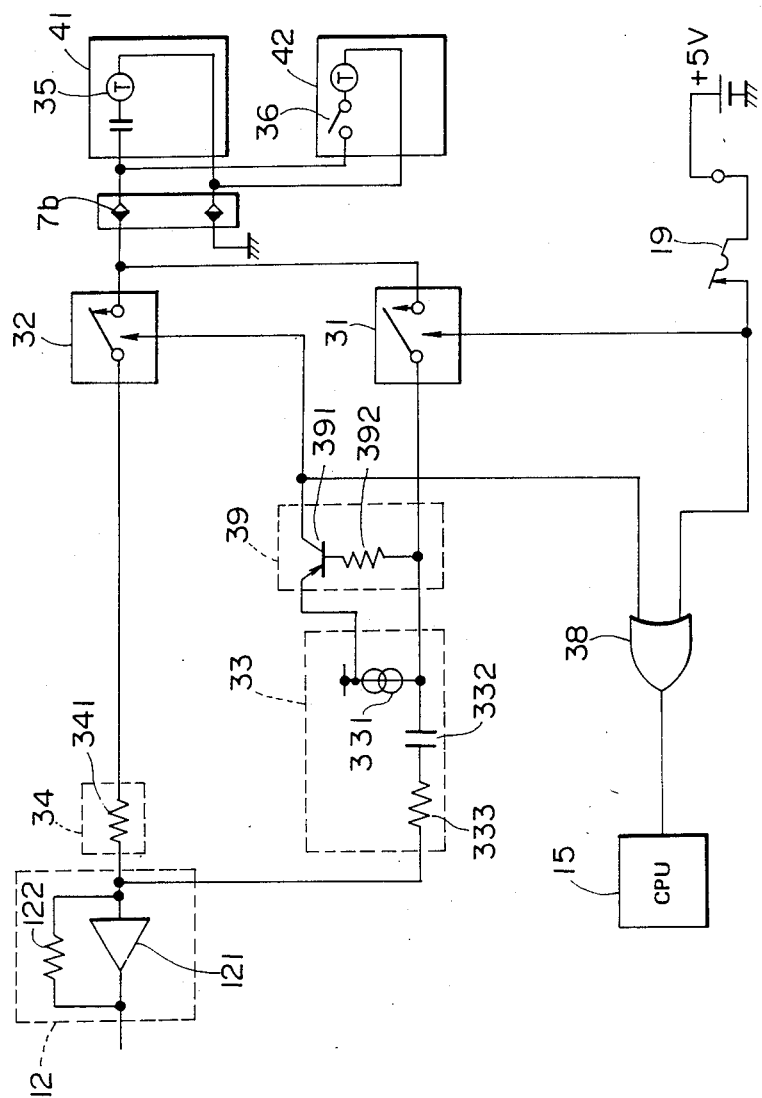
FIG. 4 is a circuit diagram showing details of the embodiment of FIG. 3.

FIG. 4 shows a detailed circuit diagram of the embodiment shown in FIG. 3. In the drawing, if the handset 41 is off the hook and thus the hook switch 19 is turned on for example, then an off-hook signal "1" is sent from the hook switch 19 to the first switching circuit 31 and also to the CPU 15 through an OR circuit 38. The first switching circuit 31, when receiving this off-hook signal "1", is changed from its ON state to an OFF state. The CPU 15, when receiving the signal "1", determines that an off-hook state exists and controls the conversation of the associated telephone set.

On the other hand, the second switching circuit 32 is held in its ON state so that the dynamic type transmitter 35 of the handset 41 is connected to a resistor 341 comprising the second interface circuit 34 which has interface conditions corresponding to the dynamic type transmitter As a result, a voice signal emitted from the dynamic type transmitter 35 is sent via the connecting terminal 7b, the second switching circuit 32 and the second interface circuit 34 to the transmitting-voice amplifier 12 which comprises the amplifier 121 and the resistor 122.

If the handset 41 is on the hook with hook switch 19 being off and the switch 36 connected in series with the carbon type transmitter 37 is turned on, then the first switching circuit 31 is held in its ON state and the carbon type transmitter 37 is connected to the first interface circuit 33 having interface conditions corresponding to the carbon type transmitter, because a signal "0" is sent from the hook switch 19 to the first switching circuit 31. This results in a current signal for driving the transmitter being supplied from a constant-current circuit 331 of the first interface circuit 33 through the first switching circuit 31, the connecting terminal 7b and the switch 36 to the carbon type transmitter 37. At this time, a current detecting circuit 39, which comprises a transistor 391 and a resistor 392, detects the current signal for driving the transmitter and applies a signal "1" to the second switching circuit 32 and also to the CPU 15 through the OR circuit 38. The second switching circuit 32, when receiving the signal "1", is changed from its ON state to an OFF state. The CPU 15, when receiving the signal "1", determines that an off-hook state exists and controls the conversation of the associated telephone set. As a result, a voice signal emitted from the carbon type transmitter is sent to the transmitting-voice amplifier 12 through the first switching circuit 31 and first interface circuit 33.

In this manner, in accordance with the present embodiment, the turning on the hook switch 19 causes the dynamic type transmitter 35 to be connected to the second interface circuit 34, whereas the turning on the switch 36 connected in series with the carbon type transmitter 37 causes the transmitter 37 to be connected to the first interface circuit 33.

Although the carbon and dynamic type transmitters have been explained as an example in the foregoing embodiments, the present invention is not limited to the particular example. For example, electret type, ceramic type and any other type transmitters may be employed, in which case one must only provide transmitter interface circuits having interface conditions corresponding to these transmitter types. In addition to the transmitters, various sorts of external apparatuses matching the transmitter interface circuits may be also connected.

Shown in FIG. 5 is yet another embodiment of the present invention in which the handset 41 and the headset 42 are connected to separate telephone modular connectors 401 and 402 respectively. In the drawing, a first hook switch 404 is provided between a telephone line 43 and a telephone set circuit 403 and a second hook switch 405 is provided between the telephone set circuit 403 and the first modular connector 401. The first and second hook switches 404 and 405 are mutually interlocked and the first hook switch 404 is connected with a switch circuit 406 in parallel therewith. A current detecting circuit 407 is connected through a line 408 to the second modular connector 402. The line 408 is also connected through a capacitor 409 to a junction point between the telephone set circuit 403 and the second hook switch 405.

The first modular connector 401 is also connected with the handset 41, while the second modular connector 402 is connected with the headset 42 through a manual switch 441 incorporated in a switch box 44.

In the present embodiment, the telephone set circuit 403 comprises a voice transformer 2, hybrid circuit 3, talking circuit LSI 5 and so on as shown in FIG. 6, and functions to switch the first interface circuit 33 corresponding to the headset 42 and the second interface circuit 34 corresponding to the handset 41 as shown in FIG. 4.

When the handset 41 is picked up, the first and second hook switches 404 and 405 are both closed to put the system in the off-hook mode, thus allowing outgoing or incoming calls. Under such a condition, since the handset 41 is connected to the telephone line 43 through the first hook switch 404, the telephone set circuit 403, the second hook switch 405 and the first modular connector 401, the handset 41 can be used for the purpose of conversation.

When the handset 41 is not picked up and the manual switch 441 of the switch box 44 is turned on, the system operates as follows. First, a DC voltage on the telephone line 43 or a DC voltage of a battery (not shown) built in the associated telephone set is always supplied to the line 408 via a line (not shown). For this reason, when the manual switch 441 is closed, the headset 42 is connected to the second modular connector 402 so that a current flows from the line 408 through the second modular connector 402 and the manual switch 441 into the headset 42. The current detecting circuit 407, when detecting the current flowing through the line 408, applies a signal indicative of "ON" to the switch circuit 406. The circuit 406 receiving the ON signal is turned on to short-circuit the first hook switch 404. Accordingly, even if the first and second hook switches 404 and 405 are both in the OFF state, the system is put in the off-hook mode, thus allowing outgoing or incoming calls. In such a mode, the headset 42 is connected to the telephone line 43 through the switch circuit 406, the telephone set circuit 403, the capacitor 409, the line 408, the second modular connector 402 and the manual switch 441, thus allowing the use of the headset 42. At this time, since the second hook switch 405 is in the OFF state, the telephone line 43 will not be connected to the handset 41 and thus any noise from the handset 41 will not enter the headset 42.

Next, if the manual switch 441 is turned off, then no current flows through the line 408 and correspondingly the current detector 407 stops the application of the ON signal to the switch circuit 406, with the result that the switch circuit 406 is turned off, thus putting the system in the off-hook mode.

In this way, in the present embodiment, picking up the handset 41 causes the first and second hook switches 404 and 405 to be turned on so that the first modular connector 401 is connected to the telephone line 43; whereas turning on the manual switch 441 causes the switch circuit 406 to be turned on so that the second modular connector 402 is connected to the telephone line 43. Thus the handset 41 and the headset 42 can both be used for the purpose of conversation immediately in the calling or answering calls. Further, when the handset 41 is lifted up and at the same time the manual switch 441 is turned on, the first and second modular connectors 401 and 402 are connected to the telephone line 43, whereby the handset 41 and the headset 42 can both be used for conversation purposes. In addition, if not only the headset 42 but a tape recorder for example is connected to the second modular connector 402 through the manual switch 441, then the conversation can be recorded on the tape recorder while talking through the handset 41.

The first and second modular connectors 401 and 402 have been provided in the foregoing embodiment, but additional modular connectors may be provided as necessary. In this connection, a circuit comprising the switch circuit 406, the current detecting circuit 406, the line 408 and the capacitor 409 is provided as connected in parallel with each of the modular connectors.

In accordance with the present embodiment, conversation can be immediately achieved with the use of any of, for example, the handset and headset connected to the first and second modular connectors.

What is claimed is:

1. A system allowing selective connection of various types of external apparatuses to a telephone set having a hook switch, the system comprising:
   first and second switching circuits connected to the external apparatuses;
   first and second external apparatus interface circuits connected through the first and second switching circuits to the external apparatuses;
   means for detecting an off-hook state of the hook switch;
   first control means for turning off the first switching circuit in response to an output of the off-hook detecting means;
   means for detecting a current flowing through the first switching circuit; and
   second control means for turning off the second switching circuit in response to an output of the current detecting means.

2. The system of claim 1, wherein the external apparatuses include a first transmitter and a second transmitter connected through a switch.

3. The system of claim 2, wherein the first transmitter is a handset transmitter and the second transmitter is a headset transmitter.

4. A system allowing selective connection of various types of external apparatuses to a telephone set, the system comprising:
   a connection terminal through which one of the various types of external apparatuses is to be connected;
   first interface means for receiving a signal from a first external apparatus, the first interface means having a first characteristic and including a current supply source for supplying a current to the one of the external apparatuses connected to the connection terminal;
   second interface means for receiving a signal from a second external apparatus, the second interface means having a second characteristic different from the first characteristic;
   first switching means provided between the first interface means and the connection terminal for selectively connecting the first interface means to the connection terminal;
   second switching means provided between the second interface means and the connection terminal for selectively connecting the second interface means to the connection terminal; and
   means for turning off the second switching means to disconnect the second interface means and the connection terminal at times when the one of the external apparatuses is the first external apparatus, and for turning on the first switching means to selectively connect the first interface means to the connection terminal at times when the first external apparatus is used, and for turning off the second switching means to disconnect the first interface means and the connection terminal and for turning on the second switching means to selectively connect the second interface means to the connection terminal at times when the one of the external apparatuses is the second external apparatus.

5. The system of claim 4, wherein the first external apparatus includes a carbon-type transmitter and the second external apparatus includes one of an electret and dynamic-type transmitter.

6. The system of claim 4, wherein the first switching means comprises:
   a first jumper wire;
   a first switching transistor having an emitter and a collector connected between the first interface means and the connection terminal, and
   a second switching transistor having a collector connected to a base of the first switching transistor and an emitter connected to ground and a base connected to a signal indicative of a use state of the first external apparatus, the signal being grounded through the first jumper wire, the first jumper wire being disconnected when the first external apparatus is connected to the connection terminal.

7. The system of claim 4, wherein the second switching means includes a second jumper wire connecting the second interface means to the connection terminal, the second jumper wire being disconnected when the first external apparatus is connected to the connection terminal.

8. A system allowing selective connection of various types of external apparatuses to a telephone set, the various types of external apparatuses including a first external apparatus having a manual operating switch, the manual operating switch being turned on at times when the first external apparatus is in use, and a second external apparatus having a hook switch, the hook switch being turned on at times when the second external apparatus is in use, the system comprising:
   a connection terminal to which the first external apparatus and the second external apparatus are connected in parallel;
   first interface means for receiving a signal from the first external apparatus, the first interface means having a first characteristic corresponding to the first external apparatus and including a current supply source for supplying current to the first external apparatus;
   second interface means for receiving a signal from the second external apparatus, the second interface means having a second characteristic corresponding to the second external apparatus;
   first switching means provided between the first interface means and the connection terminal for selectively connecting the first interface means to the connection terminal;
   second switching means provided between the second interface means and the connection terminal for selectively connecting the second interface means to the connection terminal;
   current detecting means for detecting an output current of the current supply source of the first interface means when the manual operating switch of the first external apparatus is operated;
   first control means for turning off the first switching means when the hook switch is turned on; and
   second control means for turning off the second switching means in response to an output of the current detecting means.

9. The system of claim 8, wherein the first external apparatus includes a carbon-type transmitter and the second external apparatus includes an electret or dynamic-type transmitter.

10. The system of claim 8, further comprising:
   logical OR means for performing a logical OR operation between an output of the hook switch and the output of the current detecting means, and
   means for determining on the basis of an output of the logical OR means that either one of the first or second external apparatuses has been put in its operative state.

11. A system allowing selective connection of various types of external apparatuses to a telephone set, the system comprising:
   a first connection terminal to which a first external apparatus is to be connected through a manual switch;
   a second connection terminal to which a second external apparatus is to be connected;
   a telephone set circuit for processing signals going to and from the first and second external apparatus;
   a capacitor connected between the telephone set circuit and the first connection terminal;
   a first hook switch connected between the telephone set circuit and the second connection terminal, the first hook switch being turned on at times when the second external apparatus is used;
   a second hook switch connected between the telephone set circuit and a telephone circuit, the second hook switch being turned on in conjunction with the first hook switch at times when the second external apparatus is used;
   switching means connected in parallel to the second hook switch for bypassing the second hook switch;
   means for detecting a current flowing from the telephone set circuit to the first connection terminal at times when the manual switch is operated; and
   means for turning on the switching means in response to an output of the current detecting means.

12. The system of claim 11, wherein the first external apparatus is a headset and the second external apparatus is a handset.

* * * * *